United States Patent [19]

Umeki

[11] Patent Number: 5,130,596
[45] Date of Patent: Jul. 14, 1992

[54] ARMATURE OF A ROTARY ELECTRIC MACHINE WITH A COMMUTATOR AND A CONDUCTOR FOR THE ARMATURE COIL

[75] Inventor: Satoru Umeki, Hitachi, Japan

[73] Assignees: Hitachi, Ltd., Ibaraki; Hitachi Automotive Engineering Co., Ltd., Tokyo, both of Japan

[21] Appl. No.: 492,908

[22] Filed: Mar. 13, 1990

[30] Foreign Application Priority Data

Mar. 13, 1989 [JP] Japan ................................ 1-57729

[51] Int. Cl.[5] ............................................ H02K 13/04
[52] U.S. Cl. ........................................ 310/234; 310/43;
  310/44; 310/198; 310/211; 310/235; 310/261
[58] Field of Search ................. 310/43, 211, 45, 44,
  310/261, 264, 265, 233-235, 198, 200, 201, 207,
  208, 236, 202-206

[56] References Cited

U.S. PATENT DOCUMENTS

| 1,631,186 | 6/1927 | Apple . | |
| 1,738,166 | 12/1929 | Apple | 310/265 |
| 1,839,858 | 1/1932 | Apple . | |
| 1,849,215 | 3/1932 | Apple . | |
| 1,875,203 | 8/1932 | Apple | 310/201 |
| 1,917,482 | 7/1933 | Apple . | |
| 2,298,862 | 10/1953 | Balz | 310/233 UX |
| 2,756,354 | 7/1956 | Baron | 310/43 |
| 3,697,792 | 10/1972 | Roue | 310/234 |
| 4,004,167 | 1/1977 | Meckling | 310/44 |
| 4,417,388 | 11/1983 | Major | 310/206 |
| 4,437,230 | 3/1984 | Greutmann | 310/234 |
| 4,484,094 | 11/1984 | Ade | 310/43 |
| 4,833,769 | 5/1989 | Tomite | 310/43 |

FOREIGN PATENT DOCUMENTS

| 2127556 | 12/1972 | Fed. Rep. of Germany . | |
| 2833899 | 2/1979 | Fed. Rep. of Germany | 310/44 |
| 0999112 | 1/1952 | France . | |
| 2260213 | 8/1975 | France . | |
| 0023914 | 2/1979 | Japan . | |
| 0132147 | 10/1981 | Japan . | |
| 0141157 | 7/1985 | Japan | 310/44 |
| 0037696 | 8/1985 | Japan . | |
| 0218341 | 8/1989 | Japan . | |
| 1581350 | 12/1980 | United Kingdom . | |

Primary Examiner—R. Skudy
Attorney, Agent, or Firm—Antonelli, Terry, Stout & Kraus

[57] ABSTRACT

Lower coils (5b) and upper coils (5a) are inserted to slots (12) of a cylindrical armature core (4). The upper coils are used as crossover lines (102a) at the side of commutator (10) and form commutator segments. The crossover lines are approximately deviated by a pole pitch (yf) at the commutator and inserted to other slots as lower coils. The lower coils are used again as crossover lines and deviated approximately by the pole pitch at the opposite side of the commutator so as to be inserted again to the slots as the lower coils. An insulating resin (11) are forced to push into inner peripheral sides of the armature core, and the crossover lines forming a squirrel cage type shape and extending cylindrically from the core.

7 Claims, 4 Drawing Sheets

ARMATURE OF A ROTARY ELECTRIC MACHINE WITH A COMMUTATOR AND A CONDUCTOR FOR THE ARMATURE COIL

FIELD OF THE INVENTION

The present invention relates to an armature of a rotary electric machine with a commutator, to a method of producing the same, and to a conductor for the armature coil.

BACKGROUND OF THE INVENTION

In an armature of a conventional rotary electric machine with a commutator disclosed in Japanese Patent Laid-Open No. 23914/1979, an insulating material is charged into space among the commutator comprising commutator segments that are molded with a resin, the armature core on which the coils are wound, and the armature shaft, in order to tightly fasten them together.

In an armature of another conventional rotary electric machine with a commutator disclosed in Japanese Patent Publication No. 37696/1985, a conductor of the commutator that is annularly formed as a unitary structure and that does not include resin, is allowed to penetrate through the armature shaft that mounts the iron core on which the coils are wound in order to fasten the end of the armature coil to the commutator, an insulating material is charged into the conductor of the commutator and into space constituted by the armature core and the armature shaft to mold them as a unitary structure while fastening the conductor of the commutator to the armature shaft, and then the conductor of the commutator is cut over the outer periphery thereof so as to be divided into a plurality of conductors.

According to these conventional examples, furthermore, the commutator segments and the armature coils are composed of separate members and are connected together by fusing.

In the armature of the former conventional rotary electric machine with the commutator, the insulated commutator segments and the armature coils are separately formed and are fastened to the armature shaft with a resin. Therefore, the step for insulation among the commutator segments that constitute the commutator is carried out separately from the step for fastening the commutator segments and the armature coils to the shaft, though they are similar steps for molding with the resin. Hence, the operation efficiency is poor.

In the latter conventioned rotary electric machine, the step for insulating the commutator segments by molding the resin and the step for fastening the commutator to the shaft by molding the resin are carried out through a single manufacturing process. However, since the iron core on which the coils are wound must be forced onto the armature shaft to form the armature coils in a conventional manufacturing process, the step for fastening the commutator to the shaft is carried out separately from the step for fastening the armature core to the shaft, causing the operation efficiency to be deteriorated.

In the former conventional armature, however, a seam develops between the resin layer that insulates the commutator segments and the resin layer that fastens the commutator to the shaft, and between the armature core and the resin layer that fastens it to the shaft, due to difference in the composition or in the material.

In the later conventional armature, the step for fastening the armature core to the shaft and the step for fastening the commutator segments to the shaft have to be carried out separately.

When the armature is rotated at high speeds under the temperature conditions of higher than 200° C. or lower than 40° C. below freezing point, gaps are formed in the seams and water infiltrates due to difference in the thermal expansion of the compositions and materials and due to peeling action caused by mechanical vibration of the rotary electric machine. When the armature is subjected to low temperature with water being infiltrated therein, then the water freezes and increases its volume to develop cracks in the resin. When such a cold-hot cycle is repeated, the resin is gradually destroyed, and the commutator and the armature coil are separated from the rotary shaft or the commutator is separated from the armature coil due to centrifugal force produced by the revolution or due to the force of inertia when the machine stops.

Moreover, the strength of the connection portion is not large enough between the commutator segment and the armature coil conductor and the connection portion often are separated due to the pressure when the resin material is charged.

SUMMARY OF THE INVENTION

An object of the present invention is to provide a method of producing armatures of this type which enables insulation among the commutator segments to be accomplished and which enables the commutator and the armature coil to be fastened to the shaft more efficiently than those of the conventional art.

Another object of the present invention is to provide an armature which does not permit the resin to be destroyed even when it is exposed to the cold-hot cycles under the high-temperature and low-temperature conditions.

A further object of the present invention is to provide a conductor which does not permit the commutator segments and the armature coil to be separated from each other even when a strong tensile force is exerted on their connection portions.

In accordance with the present invention, one molding process is provided for fastening the commutator, armature coil and armature shaft together, with the process comprising the setting, in a metal mold maintaining a concentric relationship, a squirrel cage type armature coil and commutator segments electrically connected to the ends of a plurality of unit coils from the armature coils, a setting of the armature shaft at a central position of the commutator segments and of the cylindrical armature coils, and a charging of an insulating material in a space among the commutator segments and between the armature coils and the armature shaft.

A further object of the present invention is accomplished by providing straight portions that constitute commutator segments on the crossover portions of the conductors provided between upper armature coils and a lower armature coils, with the straight portions maintaining an equal distance relative to each other around the armature shaft.

According to the method of producing armature of the present invention, the molding operation for insulating the commutator segments and the molding work for fastening the commutator segments and the armature coils onto the armature shaft are carried out in one step contributing to improving operation efficiency and increasing productivity.

In the armature of the present invention, furthermore, since the resin layer does not have a seam for separation, no gap develops into which water infiltrates under the cold-hot cycles of high and low temperatures. Therefore, no crack develops in the resin when water freezes. Accordingly, the armature can be used under severe temperature conditions and has a long service life.

Furthermore, the conductors for the armature coils of the present invention have commutator segments that are formed as a unitary structure together therewith. Therefore, no operation is required for connection and the productivity is improved. Even when a strong tensile force is exerted at the time of charging the resin material, the conductors and commutator segments are not cut separately. Namely, there is obtained the conductors for the armature coils that can be molded under a high pressure.

DETAILED DESCRIPTION OF THE PREFERRED EMBODIMENTS

Figure 1A:
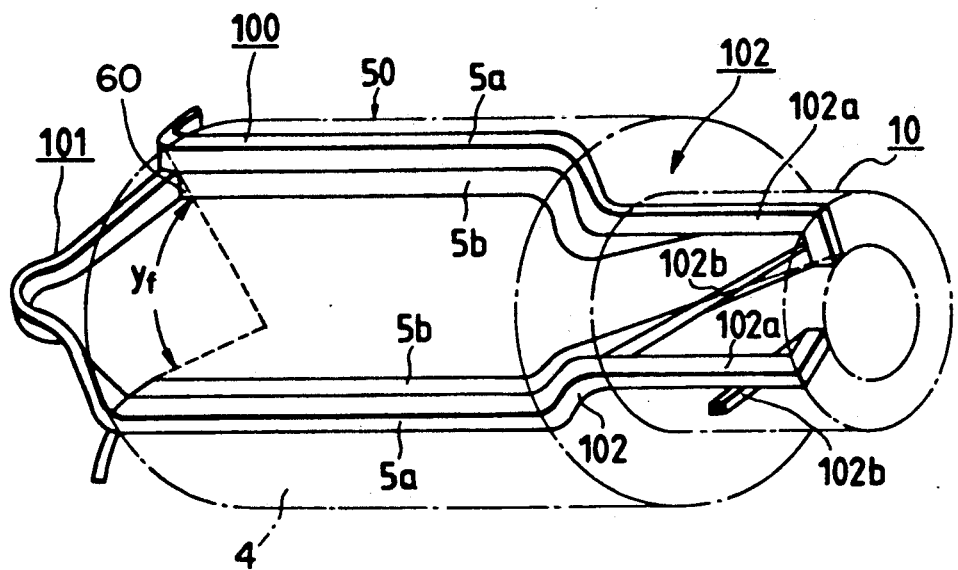
FIG. 1A is a partial perspective view of an armature of one embodiment of the present invention.
Figure 1B:
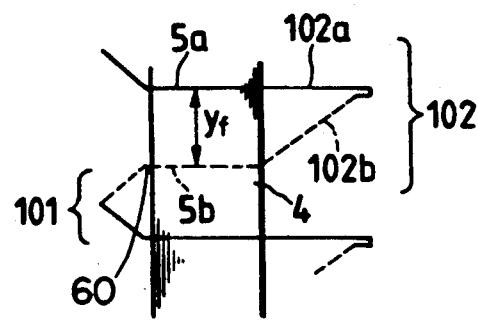
FIG. 1B is a partial development of an armature coil of one embodiment of the present invention.

Referring to FIGS. 1A and 1B, the armature comprises a squirrel cage type armature coil unit 50 and a commutator unit 10 formed at one end of the armature coil unit 50 in concentric therewith.

The armature coil unit 50 is constituted by an upper coil 5a, a lower coil 5b, and crossover lines 101 and 102 that are connected to the upper coil and the lower coil.

The crossover line 102 of the upper coil 5a on the commutator side is folded at its end by 90 degrees toward the direction of the inner diameter and is then folded at 90 degrees toward the direction of the axial line. A straight line portion 102a along the axial line serves as a commutator segment. The crossover line 102 is folded at its end by 90 degrees toward the direction of the inner diameter and is further folded toward the axial direction by 90 degrees. The crossover line 102 is then twisted at the twisted portion 102b and is extended to a position deviated approximately by a pole pitch Yf. It is then folded by 90 degrees outwardly in the radial direction and is folded again by 90 degrees in the axial direction. The crossover line 102 is terminated at this position, and is then extended as a lower coil 5b to the end on the opposite side of the commutator keeping pace with the shaft. The end 60 of the lower coil 5b is folded in a V-shape as the crossover line 101, extended to a position deviated approximately by the pole pitch Yf, and then forms a portion which keeps pace with the shaft as the upper coil 5a.

This process is repeated, and there formed the armature coil unit 50, the upper coil 5a, the lower coil 5b, the crossover line 102 on the side of the commutator and the crossover line 101 on the opposite side thereof forming a squirrel cage type single conductor 100 with a covered insulation such as polyamide, polyester or polyiamide.

Finally, the start and the end of the conductor are connected together at an appropriate position.

The upper coil 5a and the lower coil 5b are inserted in the slots of a cylindrical iron core 4 of the armature, and the skeleton of the armature and the commutator is completed.

Figure 2:
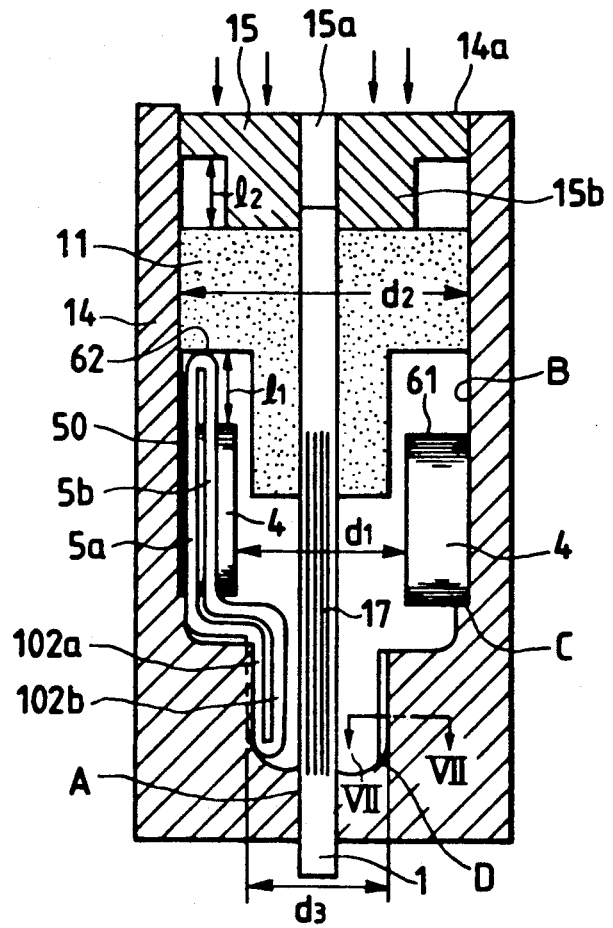
FIG. 2 is a sectional view along an axial direction showing the state where the armature is molded according to the embodiment of the present invention.

The members thus assembled are set into a metal mold as shown in FIG. 2. The iron core 4 is contacted to the inner peripheral wall B of the metal mold 14.

A metal mold 14 has a nearly cylindrical molding space and further has on the inner peripheral wall B thereof a stepped portion C. that is formed annularly to determine the position of the iron core 4 in the axial direction.

Figure 3:
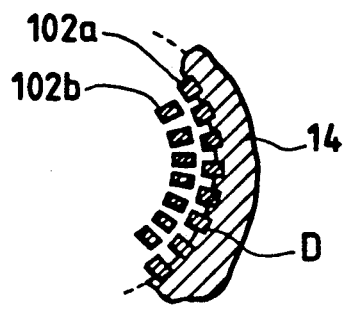
FIG. 3 is a sectional view along the line VII—VII shown in FIG. 2.

The inner diameter $d_3$ of the metal mold 14 in the side of the straight line portion 102a is selected to meet the outer peripheral diameter of the straight line portion 102a and smaller than the diameter $d_2$ of the inner surface of the metal mold 14. Along the inner peripheral wall of the metal mold 14 in the side of the commutator segment 102a, furthermore, there are formed grooves D maintaining an equal distance over the whole circumference to engage with the straight portions 102a of the crossover lines 102 that serve as commutator segments. The twisted portions 102b of the crossover lines are not always required to maintain an equal distance as in the case of the straight portions of the commutator segments 102a. This state is shown in FIG. 3.

Thus, after the armature unit and the commutator unit having the armature coil 50 are set into the mold, a shaft 1 is allowed to penetrate through the center of the mold and is held in the hole A. Several protuberances (or grooves) 17 are formed on the peripheral surface of the shaft 1 in the axial direction maintaining an equal distance.

Then, a mass 11 of an insulating resin softened by heating is set to an opening 14a of the metal mold 14 of the side opposite to the hole A of the shaft 1.

Any resin may be used provided it exhibits a predetermined hardness when solidified and electric insulation. For instance, an epoxy resin or a phenolic resin may be used. Further, the resin may be blended with an inorganic material such as glass filament or alumina.

A force plunger 15 is set to the opening 14a of the metal mold 14 to force the mass of resin 11 into space in the metal mold 14 along the shaft 1. In the center of the force plunger 15, a hole 15a is correctly punched against the inner surface B of the metal mold 14, and the shaft 1 is inserted into the hole 15a to force the force plunger 15 to the metal mold 14 with the shaft 1 and the inner surface wall B of the metal mold 14 as guides.

The force plunger 15 has a cylindrical portion 15b whose diameter is slightly greater than the inner diameter $d_1$ of the iron core 4 and whose length $l_2$ is slightly smaller than a size $l_1$ which is the length between an end 61 of the iron core 4 and an end 62 of the crossover line 102 of the armature coil.

The armature 20 molded with the resin is then taken out from the metal mold 14 and is cured by drying in a drying furnace.

Figure 4:
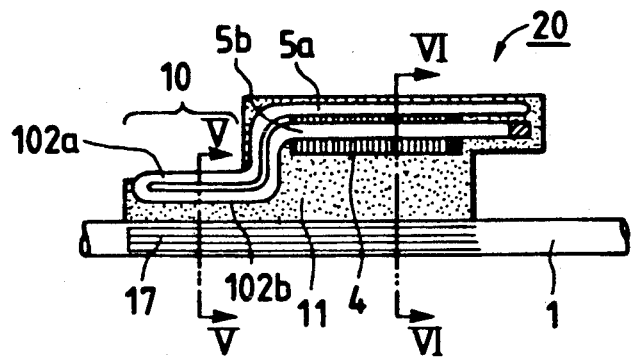
FIG. 4 is a vertical section view of the armature molded using the metal mold shown in FIG. 2.

FIG. 4 is a vertical section view of the armature 20 after cured.

Figure 5:
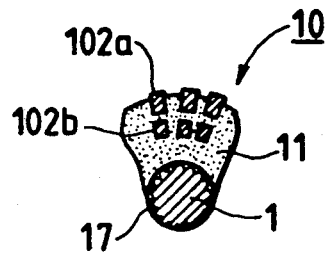
FIG. 5 is a partial section view along the line V—V shown in FIG. 4.
Figure 6:
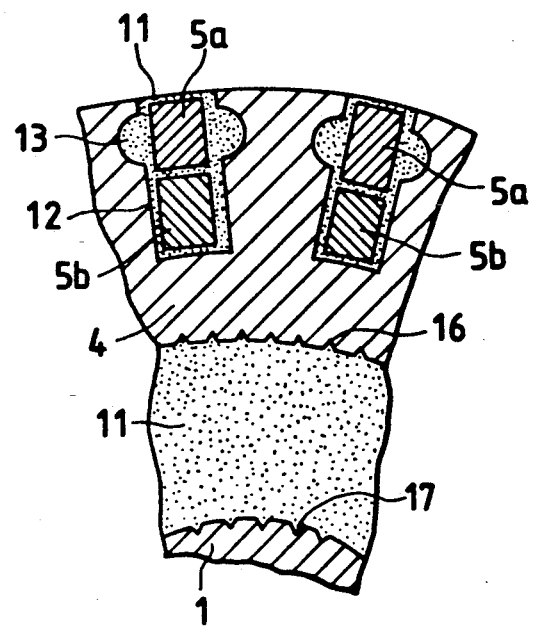
FIG. 6 is a partial section view along the line VI—VI shown in FIG. 4.

FIG. 5 is a lateral section view of the commutator unit 10, and FIG. 6 is a lateral section view of the armature unit 20.

In the commutator unit 10, the straight line portion 102a is exposed out of the resin portion. Therefore, the armature 20 is rotated to grind the exposed conductors and to finish into a smoothly curved surface in which the conductor and the resin portion are alternatively formed.

A number of slots 12 are formed along the outer peripheral portion of the iron core 4. The lower coils 5b are inserted into the under portion of the slots 12 and the upper coils 5a are inserted into the upper portion of the slots 12. A recess 13 is formed on both sides of the upper coil 5a such that the resin is allowed to flow easily thereto. After the resin is solidified, the recess works as a stopper which prevents the resin from flying outwardly due to the centrifugal force produced by the revolution of the armature.

Notches 16 are formed in the inner peripheral surface of the iron core 4 to be opposed to the grooves 17 of the shaft, and work as a stopper in the direction of the rotation and the axial direction of the armature.

The outer peripheral surface of the slot 12 is coated with a thin resin layer. The resin flows into a gap between the upper coil conductor 5a and the lower coil conductor 5b. However, no problem arises even when one conductor comes into intimate contact with another conductor, since the conductor has been coated with insulation. The same also holds true in the gap between the iron core 4 and the lower coil conductor 5b on the bottom surface of the slot 12.

Figure 7:
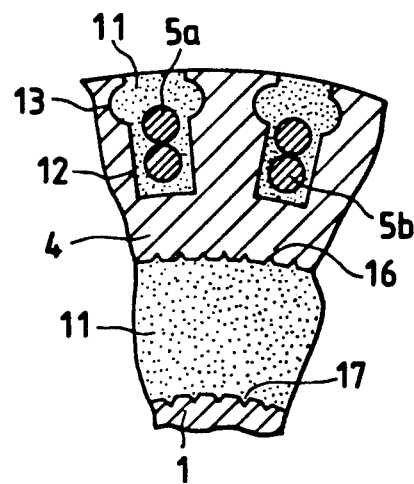
FIG. 7 illustrates another embodiment of the present invention that corresponds to FIG. 6.
Figure 8:
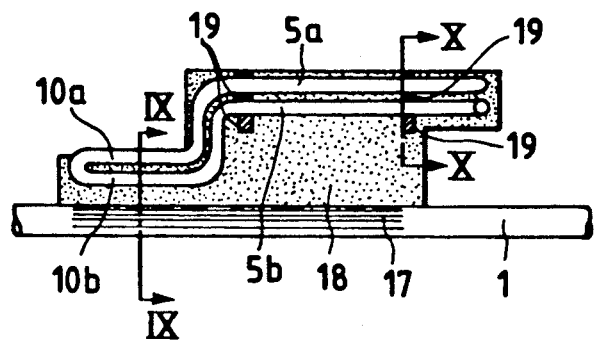
FIG. 8 is a vertical section view of the armature according to further embodiment of the present invention.
Figure 9:
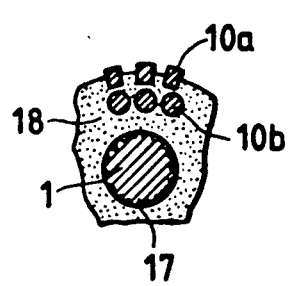
FIG. 9 is a section view along the line IX—IX shown in FIG. 8.

Here, the upper coil 5a, the lower coil 5b and the lower conductor 102b of the commutator unit 10 may have a circular shape in cross section. This is shown in FIGS. 7 and 9.

When a magnetic powder such as iron oxide is mixed into the resin to use the molding resin as a magnetic material, the iron core 4 may be made of a material having a reduced sectional area.

Figure 10:
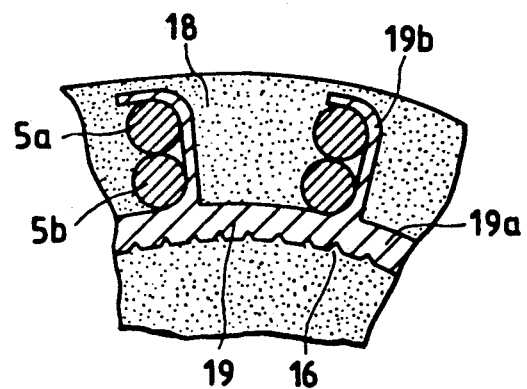
FIG. 10 is a section view along the line X—X shown in FIG. 8.

Referring to FIG. 10, a coil holding member 19 consists of an annular portion 19a and arms 19b of an inverted L-shape that extend outwardly in the radial direction. In this embodiments a round wire is used as the upper and lower coils 5a, 5b. The round wires are held in the arm 19b and are molded in the same manner as the aforementioned embodiment Reference numeral 18 denotes an insulating resin that contains the magnetic powder.

The coil holding member 19 may be formed by laminating a thin steel plate like the conventional art but may also be formed using a resin material.

Reference numeral 16 denotes notches for preventing the slip like in the aforementioned embodiment.

The shaft 1 consists of an iron-type metal rod. However, the resin rod may be used instead of the metal rod. In this case, contrivance is necessary to form a resinous shaft at both ends of the armature 20.

When the metal mold of FIG. 2 is used, the resin is poured into the hole A with the shaft 1 being removed. The resin is also poured into the hole 15a in the force plunger 15. The resin poured into the holes A and 15a work as a shaft.

According to the aforementioned embodiment, the shaft and the outer periphery of the core are in concentric with each other. Therefore, there is no need of grinding the outer periphery of the core, and the steps of working can be simplified.

According to the method of producing armatures of the present invention, the commutator unit and the coils are insulated simultaneously and the production is simplified.

In the armature of the present invention, furthermore, the crossover line unit of the coil is used as the commutator unit, enabling the axis of the armature to be shortened and contributing to reducing the size and weight.

According to the present invention, furthermore, the conductors for the armature coils have a commutator segments formed as a unitary structure together therewith, which eliminate the process for connecting the armature coil and the commutator unit together.

What is claimed is:

1. An armature of a rotary electric machine comprising:

an iron core of a cylindrical shape having a plurality of slots extending in an outer periphery thereof at an equal distance relative to each other in an axial direction of the iron core;

an armature coil comprising unit coils of a lower coil and an upper coil inserted in said slots;

an armature shaft extending along the axial direction of said iron core;

a plurality of commutator segments electrically connected to crossover portions coupled to said unit coils and arranged at an equal distance around said armature shaft; and an insulating resin charged between said iron core and said armature shaft, in the slots of said iron core, between said commutator segments, between said commutator segments and said armature shaft, and between the crossover portions coupled to said unit coils; and holding members including arms for holding said upper coil and said lower coil of said unit coils and an annular portion for coupling and for fastening the arms, and wherein said insulating resin, mixed with a magnetic powder for establishing a magnetic path, is filled between said upper coil, said lower coil and said holding members.

2. An armature of a rotary electric machine with a commutator according to claim 1, wherein a unit coil of said armature coil and said plurality of commutator segments connected thereto are constituted by a same conductor.

3. An armature of a rotary electric machine with a commutator according to claim 2, wherein said unit coils of said armature coil and said plurality of commutator segments connected thereto are continuously constituted using a single conductor.

4. An armature of a rotary electric machine according to claim 1, wherein the armature coil is a squirrel cage type armature coil and a conductor is alternatingly continuous over the upper coil, the lower coil and the crossover portions, and wherein the crossover portions are connected to said plurality of commutator segments which form straight portions, respective, along a longitudinal direction of said armature shaft.

5. An armature coil of a rotary electric machine according to claim 4, wherein said upper coil and said lower coil have a circular shape in cross section, and said straight portions of said crossover portions have substantially a square shape in cross section.

6. An armature coil of a rotary electric machine according to claim 4, wherein a straight portion of said straight portions serving as a commutator segment of said plurality of commutator segments is formed on a crossover portion of the crossover portions extending from the upper coil, and said crossover portion continuous to said lower coil is also continuous to said lower coil that enters into the slot at a position deviated by approximately one pole pitch.

7. An armature coil of a rotary electric machine according to claim 5, wherein a straight portion of said straight portions serving as a commutator segment of said plurality of commutator segments is formed on a crossover portion of said crossover portions extending from the upper coil of said armature coil, and said lower coil is also continuous to the lower coil that enters into the slot at a position deviated by approximately one pole pitch.

* * * * *